(12) United States Patent
Pierrick

(10) Patent No.: US 6,856,659 B1
(45) Date of Patent: Feb. 15, 2005

(54) CLOCK RECOVERY METHOD IN DIGITAL SIGNAL SAMPLING

(75) Inventor: Jouet Pierrick, Rennes (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/744,796

(22) PCT Filed: Jul. 20, 1999

(86) PCT No.: PCT/FR99/01768
§ 371 (c)(1),
(2), (4) Date: Jan. 30, 2001

(87) PCT Pub. No.: WO00/07324
PCT Pub. Date: Feb. 10, 2000

(30) Foreign Application Priority Data

Jul. 30, 1998 (FR) .............................................. 98 09744

(51) Int. Cl.[7] .............................. H04L 7/00; H03D 3/24; H03L 7/00
(52) U.S. Cl. ........................ 375/355; 375/376; 327/160
(58) Field of Search ........................... 375/355; 331/25; 348/465–691; 327/160

(56) References Cited

U.S. PATENT DOCUMENTS

| | | | | |
|---|---|---|---|---|
| 4,280,099 A | | 7/1981 | Rattlingourd | 328/63 |
| 4,352,195 A | * | 9/1982 | Dautremay et al. | 375/376 |
| 4,885,554 A | * | 12/1989 | Wimmer | 331/25 |
| 5,025,461 A | | 6/1991 | Pauer | 375/19 |
| 5,404,172 A | * | 4/1995 | Berman et al. | 348/465 |
| 5,596,372 A | * | 1/1997 | Berman et al. | 348/537 |
| 5,642,386 A | * | 6/1997 | Rocco, Jr. | 375/355 |
| 6,226,045 B1 | * | 5/2001 | Vidovich | 348/539 |

FOREIGN PATENT DOCUMENTS

| | | | |
|---|---|---|---|
| EP | 0020205 | 12/1980 | H04L/7/02 |
| EP | 9345564 | 12/1989 | H04L/7/02 |
| EP | 0614281 | 9/1994 | H03L/7/081 |
| EP | 0812079 | 12/1997 | H04L/7/033 |
| WO | 91/19358 | 12/1991 | H04B/1/16 |
| WO | WO 91/19358 | * 12/1991 | H04B/1/16 |

* cited by examiner

*Primary Examiner*—Amanda T. Le
*Assistant Examiner*—Lawrence B. Williams
(74) *Attorney, Agent, or Firm*—Joseph S. Tripoli; Robert D. Shedd

(57) ABSTRACT

A clock recovery method in digital signal sampling wherein the clock is generated from a phase-locking loop or PLL which multiples a given frequency by a whole number. The method includes comparing the relative position of the signals with respect to the clock so as to determine whether a selected type of the clock transitions is in phase with the same type of signal transitions by: producing over a clock period several zones, one zone corresponding to the selected type of transitions; analysing the signal transitions relatively to the clock uplink or downlink transitions; cumulating in the corresponding zone the analysis results; determining on the basis of the accumulation whether the sampling clock frequency and/or phase needs to be modified or not. The invention is applicable to signals derived from graphics cards.

8 Claims, 4 Drawing Sheets

CLOCK RECOVERY METHOD IN DIGITAL SIGNAL SAMPLING

This application claims the benefit under 35 U.S.C. §365 of International Application PCT/FR99/01768, filed Jul. 20, 1999, which claims the benefit of French Application Serial No. 9809744, filed Jul. 30, 1998.

The present invention relates to a method of clock recovery during the sampling of signals of digital type, more particularly to a method making it possible to recover the clock during the sampling of video signals arising from a computer device such as a graphics card.

The sampling of video signals arising from an analogue source is well known. It uses the Shannon-Nyquist theorem. According to this theorem, if the passband of a signal is limited to a frequency domain such as [0,Fmax], it is necessary and sufficient to sample this signal at a minimum frequency of 2×Fmax in order to be capable of reconstructing it from these samples. This constraint is manifested through the introduction of low-pass filters whose purpose is to limit the spectrum of the signals before sampling. In this case, the phase of the clock signal is of no importance in the sampling process. Indeed, one and the same signal which is sampled by two clocks of the same frequency but is phase shifted contains the same information to within a constant delay.

Such is not the case when one needs to sample video signals arising from a computer device, namely signals of digital origin. Indeed, the spectrum of these signals is very wide and they are intended to be displayed with the highest possible resolution. Accordingly, the passband should not be limited, since there would be a loss of fineness. Now, if signals of this type need to be injected into a device which comprises a sampling stage, one is confronted with the following problems:

If the incident signal is filtered so as to limit its passband and satisfy the Nyquist criteria, the response of the filter to signals of digital type exhibiting steep transitions will give rise to over-oscillations which are highly prejudicial to the sharpness of the characters.

If the incident signal is filtered only slightly so as to avoid over-oscillation, the attenuation afforded to the frequency components will be insufficient to avoid likewise prejudicial spectral aliasing.

If the incident signal is sampled without prior filtering, it is imperative to adopt not only the exact frequency which served to generate the signal, but also a sampling phase corresponding to the middle of each porch.

The problem is all the more complex since there is no predefined fixed standard in this area. Indeed, in respect of the displaying of video signals arising from a graphics card, only the number of active pixels per line of the source and the number of active lines per image of the source are defined. Accordingly, the total number of pixels per line, the total number of lines and the image frequency and pixel frequency are not standardized. Likewise, the phase of the first active pixel with respect to the edge of the synchronization clock is not defined, neither line-wise nor image-wise.

Accordingly, a purpose of the present invention is to propose a method making it possible automatically to recover the parameters of frequency and of phase of the sampling clock in the case of the sampling of signals of digital type, more particularly of video signals arising from a device of computer type.

The present invention relies on the fact that in order to be correctly sampled, incoming information must be in phase with one of the edges, more particularly the falling edge of the sampling clock, the realization of these criteria at various points of one and the same line implying a correct value of the frequency.

Accordingly, a subject of the present invention is a method of clock recovery during the sampling of signals of digital type, the sampling clock being generated from a phase-lock loop or PLL which multiplies a given frequency by an integer number or "division rank", characterized in that it comprises a step of comparing the relative position of the signals of digital type with respect to the sampling clock in such a way as to determine whether a chosen type of transition of the sampling clock is in phase with the same type of transition of the signals of digital type:

by formulating, over a period of the sampling clock, several zones, a zone corresponding to the chosen type of transition, by analysing the transitions of the signals of digital type with respect to the rising and falling transitions of the sampling clock, by aggregating in the corresponding zone the analysis results, and by determining, as a function of the aggregates, whether or not a modification of the frequency and/or of the phase of the sampling clock needs to be carried out.

According to another characteristic of the present invention, the analysis step is preceded by a step of shaping the signals of digital type into logic signals.

Preferably, the chosen type of transition is the falling transition.

According to a preferred embodiment in order to carry out the analysis of the transitions, four zones are formulated, with one zone corresponding to a rising transition, one zone corresponding to a falling transition, one zone corresponding to a top porch and one zone corresponding to a bottom porch, the analysis being carried out with the aid of two windows respectively corresponding to the rising and falling transitions of the sampling clock.

Preferably, the results of the aggregates are utilized as follows:

a) all the information is in the zone corresponding to the chosen type of transition, the signals of digital type are in phase and in frequency with the sampling clock;

b) the information is in two non-adjacent zones, there is a frequency error between the signals of digital type and the sampling clock;

c) the information is in two adjacent zones or in a single zone different from the zone corresponding to the chosen type of transition, there is a phase error between the signals of digital type and the sampling clock.

The relative values of the information in two different zones or the value of the information in a zone different from the zone corresponding to the chosen type of transition therefore determine the sense and the amplitude of the phase correction or frequency correction to be applied to the sampling clock.

The present invention also relates to a device for implementing the abovementioned method, this device essentially comprising an erasable programmable electronic circuit receiving the signals of digital type as input as well as a window-generating circuit sending signals determining the position of the various zones to the erasable programmable electronic circuit, the said erasable programmable electronic circuit delivering as output a phase error signal sent to a pulse width modulation circuit whose output acts on the PLL.

Other characteristics and advantages of the present invention will become apparent upon the reading hereinbelow of a preferred mode of implementation with reference to the hereinappended drawings in which.

To simplify the description in the figures, the same elements carry the same references.

Figure 1:
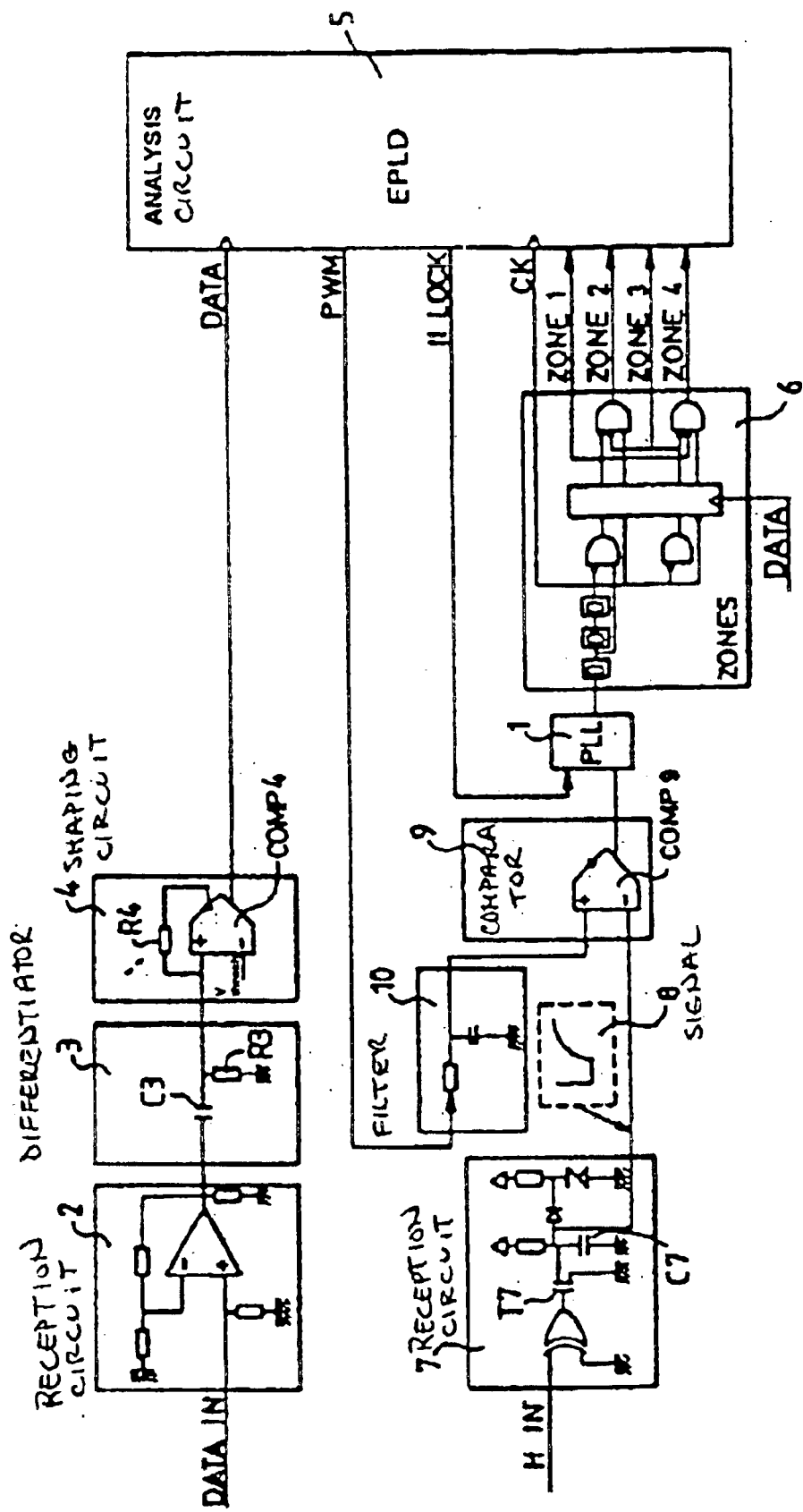
FIG. 1 is a schematic of a device in accordance with the present invention.

The circuit represented in FIG. 1 makes it possible to analyse the position of the incoming information, namely of the signals of digital type DATA IN with respect to the clock CK arising from the phase-lock loop or PLL1. To implement this analysis, the signals of digital type DATA IN are sent to a reception circuit 2 comprising in a known manner an amplifier. At the output of this circuit 2, the signals of digital type are shaped so as to obtain logic signals, more particularly signals of TTL type. The shaping circuits more particularly comprise a differentiator 3 consisting in a known manner of a capacitor C3 and of a resistor R3. The capacitor C3 is mounted in series between the output of the reception circuit 2 and the output of the differentiator 3, the resistor R3 being mounted between the output point of the differentiator 3 and earth. The differentiator is followed by a shaping circuit proper formed essentially of a comparator COMP4 receiving on its positive input the output from the differentiator 3 and on its negative input a comparison voltage $V_{thresh}$ fixed at a positive voltage close to 0V. Moreover, to avoid untimely triggering of the comparator in the presence of signals arising from the differentiator whose level is equal to $V_{thresh}$, the inverted output of the comparator COMP4 is looped back by way of a resistor R4 to the positive input of the said comparator. The logic signals DATA arising from the shaping circuit 4 are sent to an analysis circuit or erasable programmable logic circuit EPLD5. This circuit will be described in detail hereinbelow.

Moreover, the phase-lock loop or PLL 1 receives a synchronization signal H IN. This synchronization signal passes through a reception circuit 7 of known type essentially comprising an FET transistor T7 and a capacitor C7 mounted in parallel on the output of the said transistor. In this way, the signal H IN charges the capacitor across the said transistor T7 and a signal as represented at 8 is obtained at output, with the rising edge of the signal, the image of the charge of the capacitor, having an exponential shape. This signal 8 is sent to the input of a shaping circuit 9 consisting of a comparator COMP9. This signal 8 is applied to the negative terminal of the comparator whilst the positive terminal receives a signal arising from a filtering circuit 10 which receives as input a PWM ("Pulse Width Modulation") signal the obtaining of which will be explained later. Thus, a variation of the signal bound for the positive input of the comparator COMP9 makes it possible to delay the signal serving as reference to the PLL1 and thereby to modify the phase of the clock CK. The PLL1 is a conventional circuit incorporating a phase comparator and a voltage-controlled oscillator or VCO. At the output of the PLL1 is provided a circuit 6 making it possible to formulate the analysis zones, namely the windows. This circuit could be integrated into the EPLD 5. The circuit 6 is a circuit consisting of delay circuits D and of various logic gates making it possible to generate windows FEN1 and FEN2 in combinatorial logic from the clock CK and to thus produce the four analysis zones, namely zone 1 which corresponds to a top porch, zone 2 which corresponds to a bottom porch, zone 3 which corresponds to a rising transition and zone 4 which corresponds to a falling transition, as represented in the top part of FIG. 2. In fact, the accuracy of the system will depend on the width of the windows FEN1 and FEN2 centred about the rising and falling transitions. Thus, the narrower the window FEN2, corresponding to the falling transition, the more accurate the system will be.

Figure 2:
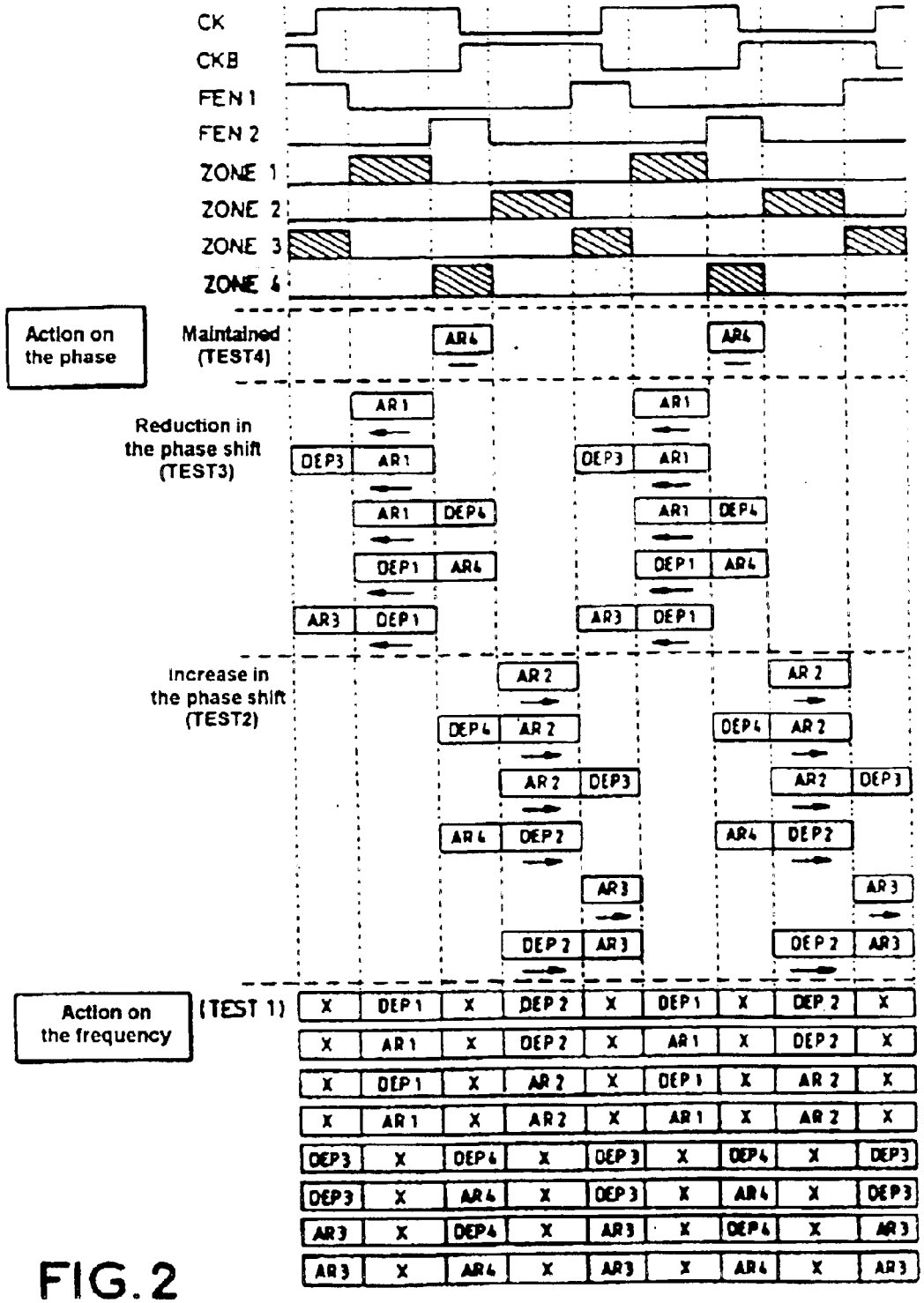
FIG. 2 represents the various tests carried out in accordance with the method of the present invention.

The clock recovery method in accordance with the present invention therefore consists in analysing the transitions of the signals of digital type DATA with respect to the rising and falling transitions of the clock CK. As mentioned hereinabove, this analysis is carried out by using the windows FEN1 and FEN2 which make it possible to determine analysis zones, namely the zones 1, the zones 2, the zones 3 and the zones 4. Thus, during a specified analysis time, the phase information regarding the phase between the logic signals DATA and the various zones is aggregated in the various zones. At the end of the specified time, the results of the aggregation are utilized so as to deduce therefrom any possible phase correction and/or frequency correction. The possible apportionments to the various zones are represented in FIG. 2. If all the aggregated information is in zone 4, namely the zone of the falling transition, as symbolized by AR4 in FIG. 2, from this one deduces that the signal CK is in phase with the logic signals DATA and no action is carried out on the phase. If information is only in zone 1, namely the top-porch zone, as represented by AR1 in FIG. 2, one deduces from this that a phase reduction must be carried out. Likewise, if information is scheduled in zone 1 (AR1) and in zone 3 (DEP3) but the level of cumulative total is attained in zone 1 (AR1). Such is the case also when information is present in zone 1 and in zone 4 but the cumulative total is attained in zone 1 or information is present in zone 1 and in zone 4 and the cumulative total is attained in zone 4 or else information is present in zone 3 and in zone 1 and the cumulative total is attained in zone 3. This is symbolized by ARi for the level of cumulative total attained in a zone and DEPi for the presence of information in a zone.

Conversely, an increase in the phase shift will be carried out when the following results of aggregation are attained. The information is present only in zone 2, namely the bottom-porch zone. Information is present in zone 4 and in zone 2 but the cumulative total is attained in zone 2. Information is present in zone 2 and in zone 3, the level of cumulative total being attained in zone 2. Information is present in zone 4 and in zone 2, the level of cumulative total being attained in zone 4. Information is present only in zone 3 with a level of cumulative total attained in this zone and information is present in zone 2 and in zone 3 with the level of cumulative total attained in zone 3.

An action on the frequency will be performed when information is present in two non-adjacent zones. Thus, as represented at the bottom of FIG. 2, information may be present in zone 1 and in zone 2 without attaining the level of cumulative total or information may be present in zone 1 and in zone 2 with a level of cumulative total attained in zone 2 or information may be present in zone 1 and in zone 2 with a level of cumulative total attained in zone 2. The level of cumulative total can be attained both in zone 1 and in zone 2, the information may be present in zone 3 and in zone 4 without the level of cumulative total attained. The information may be present in zone 3 and in zone 4 with a level of cumulative total attained in zone 4. Information may be present in zone 3 and in zone 4 with a level of cumulative total attained in zone 3 and information may be present in zone 3 and in zone 4 with the level of cumulative total attained in zones 3 and 4.

Figure 3:
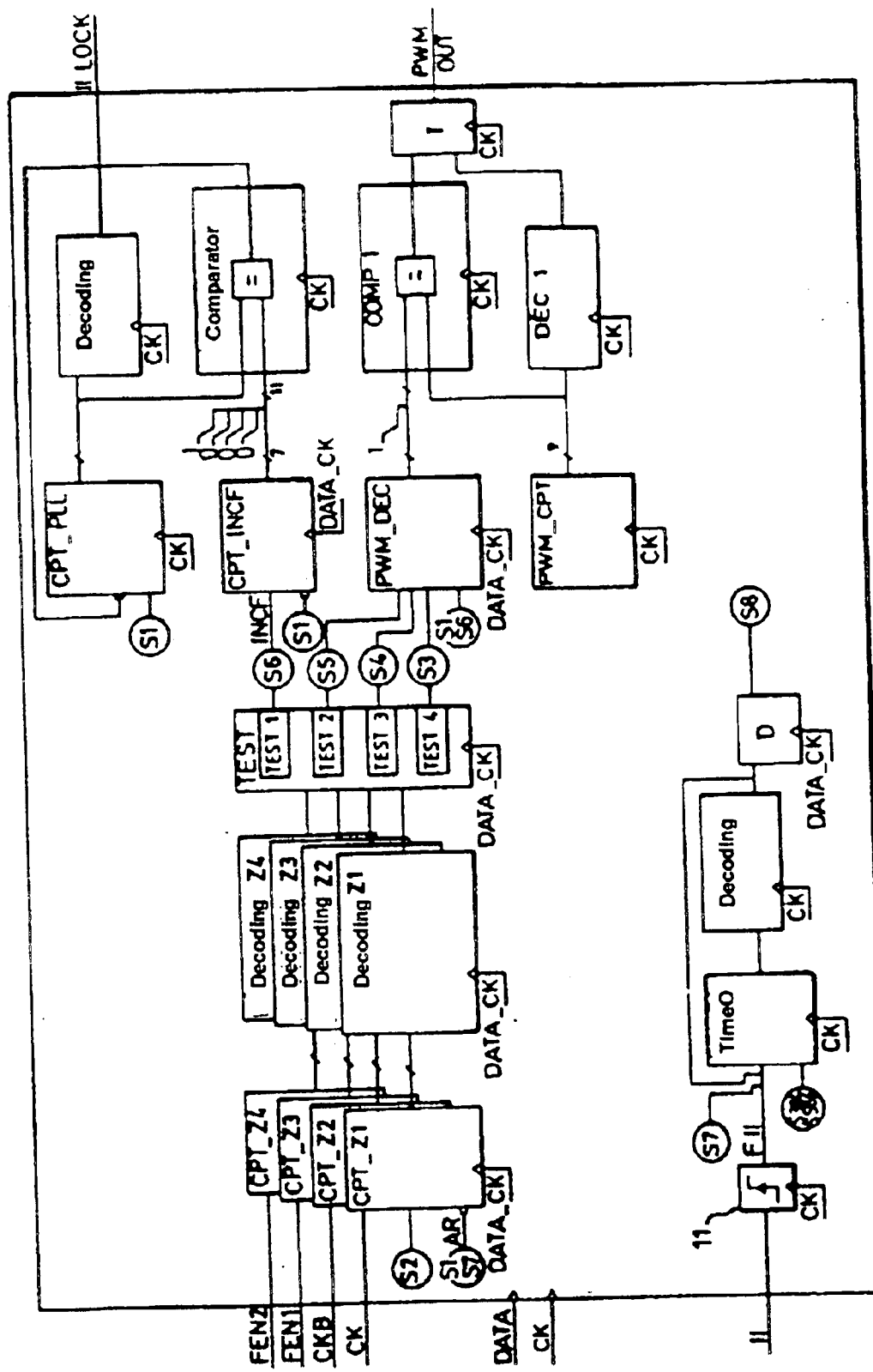
FIG. 3 represents a schematic of the erasable programmable logic circuit or EPLD.

The method hereinabove may be implemented in a programmable logic circuit EPLD such as represented in FIG. 3 by using a state machine whose symbolic representation is given in FIG. 4. The aggregation of the phase information is performed in four counters CPTZ1, CPTZ2, CPTZ3, CPTZ4, which aggregate the number of transitions per zone. These counters receive as input the signals FEN2 and FEN1, the clock signal CK and the inverted clock signal CKB. They also receive the logic signals DATA. Each counting is initialized and authorized by the state S2 of the state machine. This state is the state of initialization of the signals ar and incf in the normal regime. In this state, ar signifying the authorization of aggregation of the information at the level of the counters DECODAGEZ1, DECODAGEZ2, DECODAGEZ3, DECODAGEZ4 is at zero, infc=0 and signifies that the pulse which serves to determine the frequency increment is reset to 0 and pwm_dec signifies that the state of the circuit PWM_DEC is maintained in the previous state. The signal ARi signifying that the level of cumulative total is attained in a zone, is activated as soon as one of the counters CPTZ1, CPTZ2, CPTZ3 and CPTZ4 attains a final value thus authorizing the tests. The signal DEPi signifying that information is present in a zone i will be active if, during the analysis, the counter associated with the relevant zone has left its initial state. This analysis is carried out in the circuits referenced DECODAGEZ1, DECODAGEZ2, DECODAGEZ3, DECODAGEZ4. Subsequently, a test zone makes it possible to carry out the tests mentioned with reference to FIG. 2, namely TEST4 maintaining the phase, TEST3 carrying out a reduction in the phase shift, TEST2 carrying out an increase in the phase shift and TEST1 involving an action on the frequency once the state ARi is attained. Depending on the result, the processing will be oriented either towards a phase action, or towards a frequency action. Thus, as represented in FIG. 3, the output from TEST1 corresponding to the fact that when a circuit more particularly a counter DECODAGEZi has attained the aggregate level, information is present in zones which are not adjacent, passes through the state S6 of the state machine corresponding to timeo=1, incf=1, pwm_dec=pwm=init, this signifying that the frequency information is false and the timeout is set and is sent to a counter CPTINCF to carry out an action on the frequency later on, whilst the outputs of TEST2, TEST3 and TEST4 through the states S5, S4, S3 respectively are sent to a circuit PWM DEC making it possible to count up or count down in respect of an action on the phase. More specifically, the value arising from TEST2 signifying that when a counter DECODAGEZi has attained the aggregate level, information is present in adjacent zones, is sent to the "up" counting input, the value arising from TEST3 signifying that when a counter DECODAGEZi has attained the aggregate level, information is present in adjacent zones, is sent to the "down" counting input whilst the value arising from TEST4 signifying that when the counter DECODAGEZ4 has attained the aggregate level, no information is present in adjacent zones, does not modify the value of the up/down counter PWM_DEC. Moreover, the up/down counter PWM_DEC is loaded on its "load" input by the states S1 and S6 and is triggered by the information DATA, as explained later on.

Figure 4:
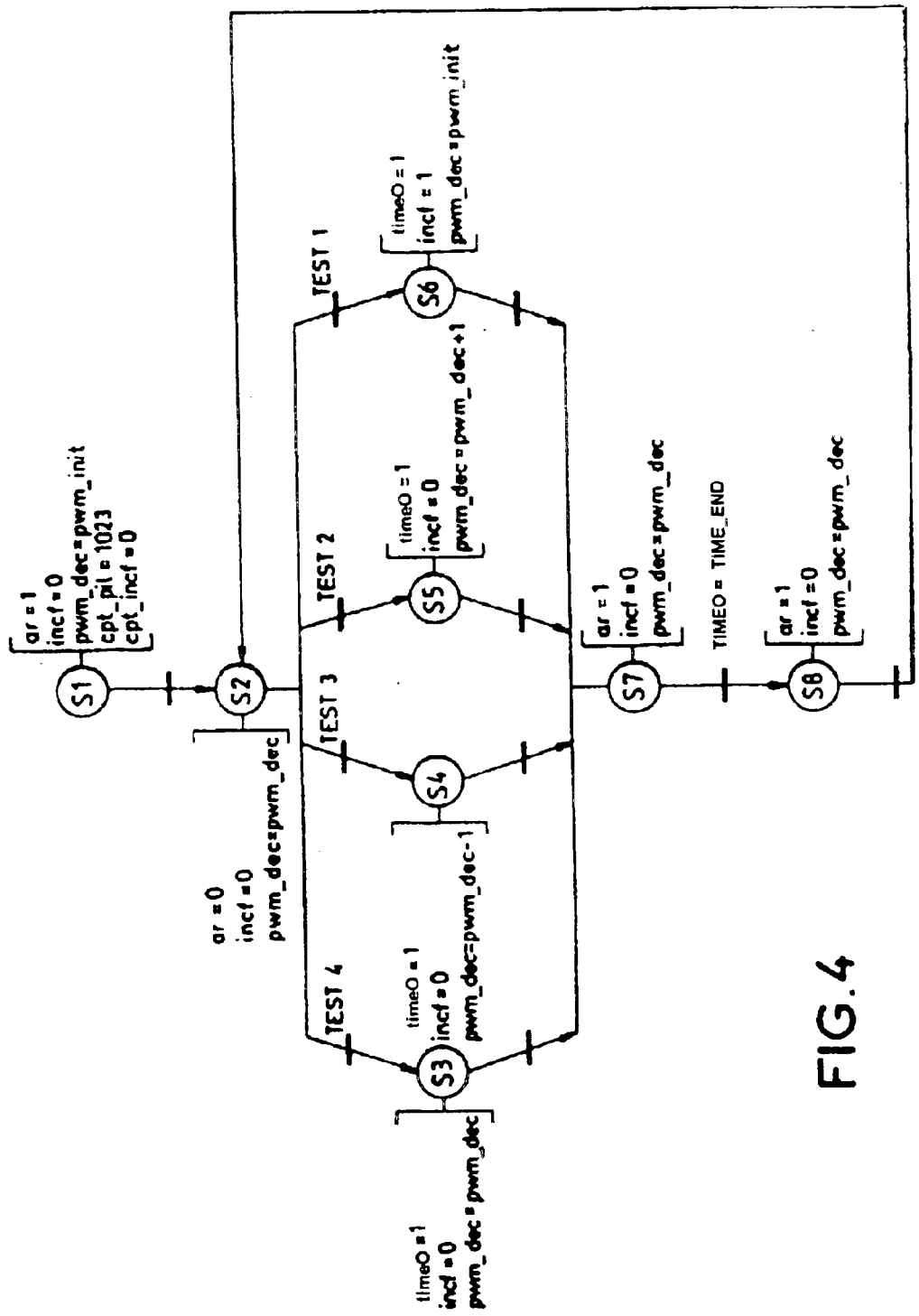
FIG. 4 is a representation of the state machine making it possible to implement in the erasable programmable logic circuit or EPLD the method of the present invention.

In more detail, the various states Si of the state machine represented in FIG. 4 correspond to the following states:

S1: state of initialization of the state machine. S1 is accessed by powering up the system.

S2: state of initialization of the signals ar and incf in the normal regime. Each time the system passes through S2, ar and incf are reset to zero.

S3: when the system is in this state, the phase and frequency information is correct. The timeout is set.

S4: when the system is in this state, the frequency information is correct but the phase information is not. It is necessary to reduce the phase shift. The timeout is set.

S5: when the system is in this state, the frequency information is correct but the phase information is not. It is therefore necessary to increase the phase shift. The timeout is set.

S6: when the system is in this state, the frequency information is false and the timeout is set.

S7: when the system is in this state, the signal ar is set to 1 and incf to 0. The counter pwm_dec[ ] is maintained in its previous state.

S8: when the system is in this state, the signal ar is set to 1 and incf to 0. The counter $pwm_{13}$ dec[ ] is maintained in its previous state. In fact, this state is redundant with S7 and can be eliminated.

In accordance with the present invention, the monitoring of the phase is carried out by using a pulse width modulation or PWM. The signal PWM-OUT generated by the EPLD circuit 5 possesses a variable duty ratio. A DC component is extracted from this signal by a low-pass filter such as the circuit 10 consisting in a known manner of a resistor R10 and of a capacitor C10. The result at the output of the filter 10 is therefore a DC voltage directly proportional to the duty ratio of the signal. Instead of a pulse width modulation circuit, it is also possible to use a serial digital/analogue converter. Thus, a modification of the duty ratio induces a modification of the overlap threshold of the sampling signal H IN and is manifested as a modification of the phase of the signal at the output of the PLL1. As represented in FIG. 3, the PWM signal is generated with the aid of two counters, the up/down counter PWM_DEC and the counter PWM_CPT which is a free counter counting between 0 and 768 for example, and which is initialized by the clock CK. The up/down counter PWM_DEC covers the range 0/255. It is initialized on startup with the state S1 and each time the state machine passes through the state S6. As mentioned above, the activation of the states 54 or S5 respectively determines either an incrementation or a decrementation of the previous value of the counter. The switching rate of the counter is synchronous with the DATA signals and its maximum period is the cumulative total of the analysis and timeout times. Passing through the state S3 causes the previous value to be maintained and passing through the state S6 brings about the return to the initial value, i.e. a duty ratio of 50%. This recentring makes it possible to avoid a positioning towards the ends which would be manifested by a state of instability, in particular when the counter is positioned at 255 and an increment takes it back to the 0 state. The signals arising from the circuits PWM_DEC and PWM_CPT are sent as input to a comparator COMP1 whose output is sent to a circuit T which receives on its other input the output from a decoding circuit DEC1 which sets the signal PWM_OUT to the 1 level when the counter PWM_CPT attains the state 256. The signal PWM_OUT reverts to 0 when the following conditions hold simultaneously., namely the MSB of the counter PWM_CPT is equal to 1 and equality is achieved between the 7 low-order bits of the counter PWM_CPT and the counter PWM_DEC. The circuit T makes it possible to effect a timeout of the signal PWM_OUT in such a way as to have time to apply each modification to the phase shifter.

In accordance with the present invention, the frequency will be monitored by modifying the number of points of the divider serving for the PLL1. In the EPLD circuit 5, the management of the frequency is carried out by using two counters CPT PLL and CPT INCF. The counter CPT PLL covers, in the embodiment represented, the range 0,1279 and moves with each transition of the clock CK. It is loaded with the state S1. The counter CPT INCF covers the range 0,127 in the embodiment of the present invention. It is initialized on startup with the state S1 and its rate of switching will be synchronous with the DATA signal and its maximum period will be the cumulative total of the analysis and timeout times. As already mentioned, the counter CPT INCF is incremented by a pulse INCA generated by the activation of the state 56 arising from the TEST1.

In the present invention, the frequency search follows a different principle from that of the phase search. In the phase search, a kind of slaving is carried out, whilst the frequency search is of empirical type. The point of departure is a value corresponding to the minimum of the range of capture. The counter CPT INCF is incremented until the phase criteria are satisfied. Moreover, the counter CPT PLL is reset to zero when the following conditions are realized: the four MSBs of the counter CPT PLL are equal to "1000", equality is achieved between the 6 low-order bits of the counter CPT PLL and the counter CPT INCF, the latter condition being satisfied with each cycle of the counter PWM CPT. Just as for the counter PWM_DEC, each modification of the state of the counter CPT INCF is retained for a minimum time corresponding to the timeout time, this therefore making it possible to apply each modification to the divider. Moreover, as represented in FIG. 3, the output from the counter CPT PLL is sent to the input of a decoding circuit DEC2 which also receives as input the clock CK and to the input of a comparator COMP2, which on its other input receives the output from the circuit CPT INCF in such a way as to carry out the abovementioned comparison operations. The comparator COMP2 also receives the clock CK. The output from the comparator COMP2 is sent to the inverted input of the counter CPT PLL. Moreover, the output of the decoding circuit DEC2 gives the signal H LOCK, the PLL comparison signal, which passes to the level when the counter CPT PLL attains the 0 state. The recurrence of this signal is directly related to the duration of a cycle of the counter CPT PLL. Moreover, the EPLD circuit of FIG. 3 comprises circuits making it possible to generate the state SB. The state 38 makes it possible to return to S2 when the timeout has elapsed, as represented in FIG. 4. For this state, the clock information H, at the input of the EPLD circuit, is sent to an integrator 11 giving a signal FH as output. This signal is sent to a timeout circuit which is initially loaded with the states S3, S4, S5, S6. The output from the timeout signal is sent to a decoding circuit DEC3 which also receives as input the clock CK. The output of the decoding circuit is sent to a D flip-flop switched by the signal DATA CK and, additionally, the output of the decoding circuit is looped back to the input of the timeout circuit.

Various modifications and improvements may be made to the system described above. Thus, the authorization of the test depends on the states ARi obtained when one of the aggregating counters attains the value VAL END which is fixed for example at the value 768. In this case, it is possible to determine the lock-on time of the system. This time is given by the following equation:

$$T = (F+P) \times ((\Sigma T_D) + 2 \times 10^{-3})$$

in which F represents the number of increments required to obtain the correct frequency and P represents the number of increments required to obtain the correct phase.

$\Sigma T_D$ represents the time required to acquire the 768 data.

In fact the maximum convergence time will be attained when there is just one point per image. For an image frequency of 50 Hz and for a point frequency lying at the maximum of the frequency and phase compensation span, the time T is equal to 72 minutes. This time may be greatly decreased by adapting the value VAL END as a function of the input bit rate, namely by counting the events during an image. Moreover, in the presence of just one point per image, it will be possible to respect the phase convergence criteria, even though the frequency is wrong. For better convergence, a simple solution consists in using the rising edges and also the falling edges of the information. In this case, the accuracy is dependent on the width of the pulse and hence on the line-wise position of the events.

Moreover, by detection of standard, namely by counting the number of lines per image, it is possible to preset the counter CPT PLL to an initial value such that the frequency obtained is at the bottom limit of the target compensation span. This operation will therefore make it possible to optimize the speed of convergence and to limit the phenomena of under- or over-sampling.

What is claimed is:

1. Device for synchronizing a sampling clock in the case of sampling digital signals comprising:
   a phase lock loop (PLL) which multiplies a signal at a given frequency by an integer number, said PLL receiving a reference signal at an input thereof and outputting a clock signal,
   means for formulating n analysis zones, said formulating means receiving the clock signal at an input and outputting signals determining the n analysis zones,
   an analysis circuit for comparing, during a specified time, digital signals to signals determining the n analysis zones, counting by zone the results of the comparisons then testing the results of the comparisons in order to send either a phase correction signal to an input of a comparator, the other input receiving the reference signal and the output being connected to the PLL input or a frequency correction circuit sent to the input of the PLL to modify the integer number.

2. Device according to claim 1, wherein the formulating means comprises a circuit in combinatorial logic treating the clock signal from the PLL to generate windows in combinatorial logic to produce the n analysis zones.

3. Device according to claim 2, wherein the windows respectively correspond to the rising and falling transitions of the sampling clock.

4. Device according to claim 1, wherein the formulating means formulates four zones wherein a first zone corresponds to a rising transition, a second zone corresponds to a falling transition, a third zone corresponds to a top porch and a fourth zone corresponds to a bottom porch.

5. Device according to claim 1, wherein the analysis circuit is constituted by an erasable programmable electronic circuit.

6. Device according to claim 1, wherein the analysis circuit comprises
   a plurality of counters, each counter being associated with a respective zone, each counter counting the number of transitions by zone, being reset at the beginning of each analysis time and being able to count up to a maximal cumulative value;
   a plurality of decoding circuits, each decoding circuit connected to an output of a respective counter; and
   a testing circuit connected to an output of each of the plurality of decoding circuits, said testing circuit sending signals to a first counter, the output of said first counter being sent to a circuit giving the value of the frequency correction signal and to a pulse modulation circuit giving the value of the phase correction signal.

7. Device according to claim 6, wherein the pulse modulation circuit comprises a first up/down counter and a second counter counting up to a given maximum value.

8. Device according to claim 6, wherein the testing circuit compares the output value of each decoding circuit and determines in relation with the relative output values of two different decoding circuits or with the output value of an decoding circuit different from the specific analysis circuit corresponding to a specific transition in the clock signal, the direction and the magnitude of the phase correction signal or of the frequency correction signal to apply on the clock signal.

* * * * *